(12) United States Patent
McLean

(10) Patent No.: US 11,159,111 B2
(45) Date of Patent: Oct. 26, 2021

(54) ELECTRIC MACHINE FOR A MOTOR VEHICLE OR MOTORCYCLE

(71) Applicant: Bayerische Motoren Werke Aktiengesellschaft, Munich (DE)

(72) Inventor: Brian McLean, Toronto (CA)

(*) Notice: Subject to any disclaimer, the term of this patent is extended or adjusted under 35 U.S.C. 154(b) by 70 days.

(21) Appl. No.: 16/677,239

(22) Filed: Nov. 7, 2019

(65) Prior Publication Data

US 2020/0076341 A1 Mar. 5, 2020

Related U.S. Application Data

(63) Continuation of application No. PCT/EP2018/061115, filed on May 2, 2018.

(30) Foreign Application Priority Data

May 12, 2017 (DE) ...................... 10 2017 208 020.5

(51) Int. Cl.
*H02P 21/06* (2016.01)
*B62K 11/00* (2006.01)
*H02K 1/27* (2006.01)

(52) U.S. Cl.
CPC .............. *H02P 21/06* (2013.01); *B62K 11/00* (2013.01); *H02K 1/2706* (2013.01); *B62K 2204/00* (2013.01)

(58) Field of Classification Search
CPC ..... H02P 21/06; B62K 11/00; B62K 2204/00; H02K 1/2706
See application file for complete search history.

(56) References Cited

U.S. PATENT DOCUMENTS

| 9,484,791 | B2 | 11/2016 | Brockerhoff et al. |
| 10,768,028 | B2* | 9/2020 | Biegert .................. G01D 5/145 |
| 2007/0176507 | A1 | 8/2007 | Tsuji |
| 2013/0325240 | A1 | 12/2013 | Ozaki |
| 2019/0326800 | A1* | 10/2019 | Pyeon ..................... H02K 11/40 |
| 2019/0334403 | A1* | 10/2019 | Aso ........................... H02K 3/38 |

FOREIGN PATENT DOCUMENTS

| DE | 10 2013 013 081 A1 | 2/2014 |
| DE | 10 2013 020 985 A1 | 8/2014 |
| DE | 10 2014 204 133 A1 | 9/2015 |
| EP | 3 065 273 A1 | 9/2016 |
| EP | 3 104 505 A1 | 12/2016 |
| JP | 5262583 B2 | 8/2013 |

OTHER PUBLICATIONS

PCT/EP2018/061115, International Search Report dated Jul. 31, 2018 (Three (3) Pages).
German Search Report issued in German counterpart application No. 10 2017 208 020.5 dated Dec. 20, 2017, with Statement of Relevancy (Eight (8) pages).

* cited by examiner

*Primary Examiner* — Zoheb S Imtiaz
(74) *Attorney, Agent, or Firm* — Crowell & Moring LLP

(57) ABSTRACT

An electric machine for a vehicle includes a stator and a rotor, where the rotor is inserted into an interior space of the stator such that the rotor rotates about an axis of rotation during normal operation of the electric machine. The rotor has a receiving area in which a rotor position sensor is received, and the rotor position sensor is configured to supply an output signal to control the electric machine during normal operation of the electric machine, said output signal indicating a rotational position of the rotor.

11 Claims, 1 Drawing Sheet

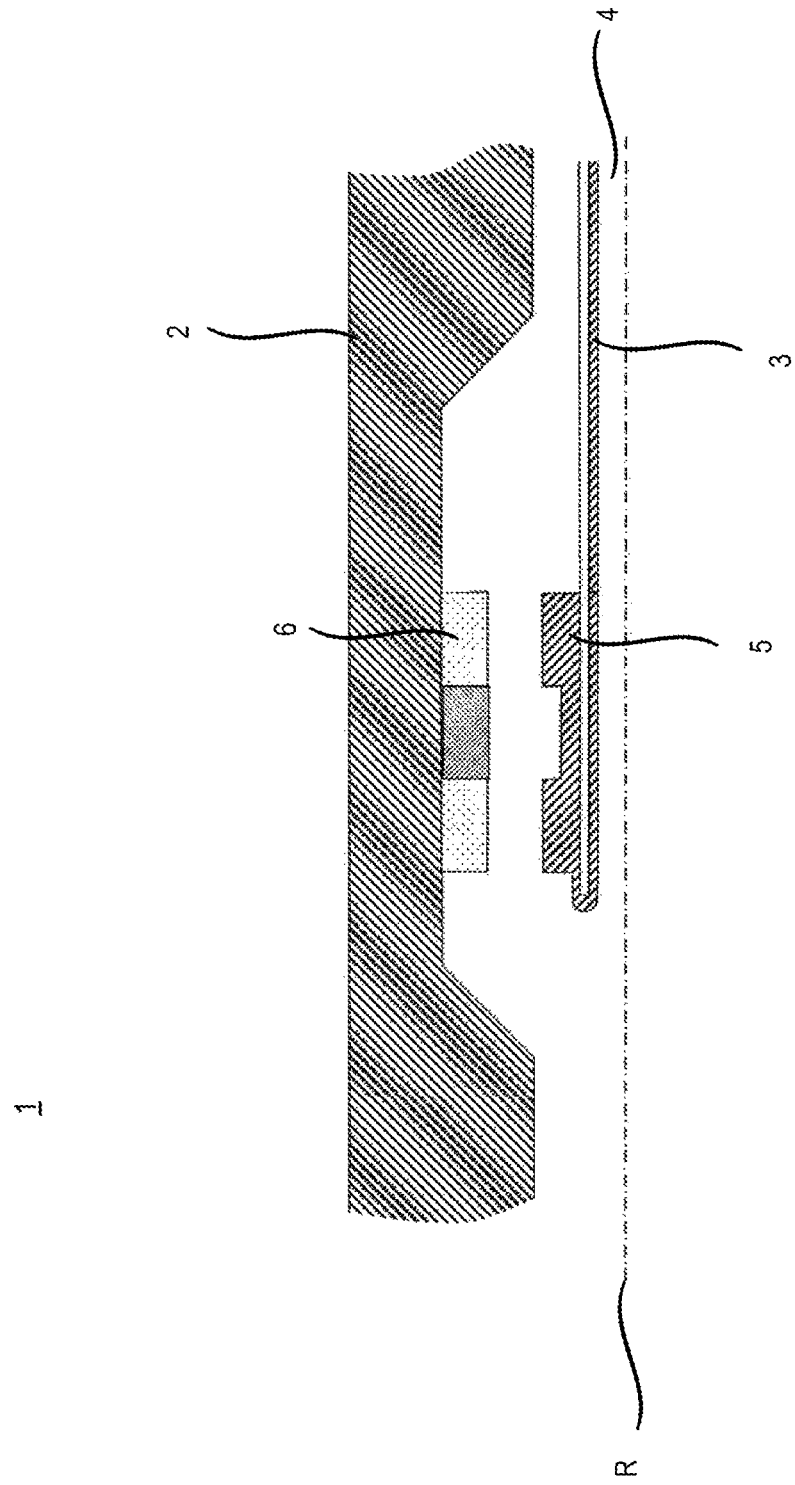

ELECTRIC MACHINE FOR A MOTOR VEHICLE OR MOTORCYCLE

CROSS REFERENCE TO RELATED APPLICATIONS

This application is a continuation of PCT International Application No. PCT/EP2018/061115, filed May 2, 2018, which claims priority under 35 U.S.C. § 119 from German Patent Application No. 10 2017 208 020.5, filed May 12, 2017, the entire disclosures of which are herein expressly incorporated by reference.

BACKGROUND AND SUMMARY OF THE INVENTION

The invention relates to an electric machine for a motor vehicle or motorcycle, especially an electric machine working as a drive unit.

Electric machines for the driving of motor vehicles or motorcycles are generally known and are being used to an increasing extent for ecological reasons.

For example, the electric machines are externally excited inner-rotor machines in which the position of rotation needs to be ascertained in order to ensure a control of the electric machine.

In the prior art, it is known to measure the position of rotation of the rotor by a rotor position encoder or a resolver and to use the corresponding output signal for the control of the electric machine. In the prior art, the rotor position encoder/resolver is arranged axially at the end of the rotor. By virtue of this arrangement, there is a significantly increased space requirement for the electric machine.

Given this background, the problem which the present invention proposes to solve is to create an electric machine having a reduced space requirement.

According to one aspect of the invention, an electric machine designed for a motor vehicle or motorcycle comprises:
a stator; and
a rotor, which is inserted into an interior space of the stator such that the rotor rotates about an axis of rotation during normal operation of the electric machine, wherein
the rotor has a receiving area in which a rotor position sensor is received, which supplies an output signal used for controlling the electric machine during normal operation of the electric machine, said output signal indicating a rotational position of the rotor.

The electric machine according to the invention is preferably an electric machine with an inner rotor, where the stator forms the outer stationary part and establishes the interior space in which the rotor is installed as the rotating element during normal operation.

The rotor is preferably an externally excited rotor, i.e., the rotor carries at least one exciter coil in which a flow of current is generated during normal operation to build up a magnetic field. The magnetic field built up by the exciter coil interacts with a rotary magnetic field which is generated by coils arranged on the stator so that the rotor rotates about the axis of rotation during normal operation.

For example, in order to control the electric machine according to the invention, it is desirable to ascertain the present position of rotation of the rotor and on this basis to control the electric machine, for example, the current flow through the exciter coil.

By position of rotation is meant the degree of rotation of the stator in relation to a reference position. For example, it means the current angle of rotation in relation to the reference position, which is between 0° and 360°. This position of rotation is ascertained by means of the rotor position sensor and the corresponding output signal is output and used to control the electric machine.

The rotor position sensor is received according to the invention in the receiving area which is established by the rotor. The rotor position sensor may be situated such that it rotates along with the rotor, and the output signal of the rotor position sensor indicating the position of rotation is transmitted to the outside, for example across slip contacts or in a contactless manner, for the corresponding control of the electric machine. For example, the rotor position sensor may be a resolver, having for example two stationary resolver excitation windings in the receiving area, which are excited by phase-shifted signals, and one resolver signal winding secured on the rotor of the electric machine and providing the output signal indicating the position of rotation of the rotor. However, the resolver excitation windings and the resolver signal winding may also be arranged vice versa, i.e., the resolver excitation windings are arranged on the rotor of the electric machine and the resolver signal winding is arranged so as to be stationary in the receiving area.

Especially preferably, however, the rotor position sensor is situated in the receiving area of the rotor such that the rotor rotates relative to the rotor position sensor, which is arranged so as to be stationary.

In this context, the electric machine according to the invention is preferably designed such that the rotor is a hollow shaft which rotates about the axis of rotation and the receiving area is formed by the interior space of the hollow shaft.

Preferably, the rotor position sensor is secured in the interior space on a carrier element and supported by the latter.

In this, the rotor position sensor can preferably be secured in various ways on the carrier element. For example, the rotor position sensor may be integrated in the carrier element, i.e., parts of the rotor position sensor and the carrier element are formed monolithically.

Preferably, however, the rotor position sensor can be secured on the carrier element by form fit and/or force locking and can be loosened from the carrier element in a nondestructive manner.

If the receiving area is preferably formed by the interior space of the hollow shaft, a rotor position sensor having a sensor track is preferably used, wherein the sensor track is preferably present on an inner wall of the hollow shaft forming the rotor which establishes the interior space and it moves upon rotation of the rotor relative to the rotor position sensor, which provides the output signal by detecting the sensor track.

Preferably, the rotor position sensor may be for example an incremental encoder, which determines the output signal indicating the position of rotation of the rotor by detecting the sensor track. The instrumental encoder may be arranged on the carrier element and the sensor track may be arranged on the mentioned inner wall. Alternatively, it is also possible in this context to arrange the incremental encoder and the sensor track vice versa.

Furthermore alternatively, the rotor position sensor may also be for example an absolute value encoder, which determines the output signal indicating the position of rotation of the rotor by detecting the sensor track, which in this case is an absolute sensor track. The absolute value encoder may be arranged on the carrier element and the sensor track may be arranged on the mentioned inner wall.

Alternatively, it is also possible in this context to arrange the instrumental encoder and the sensor track vice versa.

Preferably, the carrier element is introduced into the interior space of the rotor from one side of the electric machine in such a way that the hollow shaft forming the rotor rotates relative to the carrier element during normal operation.

Thanks to this configuration, the carrier element and with it the corresponding rotor position sensor can be easily mounted and dismounted by being introduced from one side into the interior space. Also in this manner the carrier element can be easily suspended outside the hollow shaft.

Furthermore, the carrier element is preferably a cooling lance, having at least one duct through which a cooling medium can be taken into and out from the hollow shaft during normal operation. In this way, it is not necessary to fabricate a separate carrier element, but rather an already existing element such as the cooling lance can also be used to support the rotor position sensor. Consequently, the number of extra parts needed can be kept low.

Especially preferably, the rotor is an externally excited rotor, wherein electrical conductors needed for a connection of the rotor position sensor extend on and/or in the carrier element and are led out from the hollow shaft, starting from the rotor position sensor, where they are brought together with electrical conductors needed for the external excitation of the rotor in a cable harness.

Furthermore preferably a plurality of rotor position sensors are arranged on the carrier element, preferably in the direction of the axis of rotation, in order to increase the resolution of the position of rotation of the rotor.

The invention likewise relates to a motor vehicle or a motorcycle having an electric drive unit for the driving of the motor vehicle or the motorcycle, wherein the drive unit is an electric machine as has been explained above.

Thanks to the arrangement of the rotor position sensor according to the invention, it is possible to significantly optimize the design space required for the electric machine, since, as a result of the invention, the rotor position sensor no longer needs to be arranged on an end face of the electric machine.

In the following, a preferred embodiment of the invention will be explained with reference to the single FIGURE, this FIGURE showing a longitudinal section through a rotor of an electric machine according to the invention.

Other objects, advantages and novel features of the present invention will become apparent from the following detailed description of one or more preferred embodiments when considered in conjunction with the accompanying drawings.

BRIEF DESCRIPTION OF THE DRAWINGS

The FIGURE shows a partial cut-out view of an electric machine according to the invention. The partial cut-out view is a longitudinal section.

DETAILED DESCRIPTION OF THE DRAWINGS

The electric machine according to the invention may be used in particular as an electric drive unit of a motor vehicle or a motorcycle The electric machine 1 according to the invention comprises a stator, not shown in the FIGURE, which carries a plurality of coils for generating a rotating magnetic field, and a rotor 2.

The rotor 2, which is shown in longitudinal section in the FIGURE, rotates about an axis of rotation R during normal operation of the electric machine 1. The rotor 2 is preferably an externally excited rotor, having for this purpose an exciter coil, not shown. During normal operation of the electric machine 1, an electric current flows through the exciter coil, whereby the exciter coil generates a magnetic field, which interacts with the rotating magnetic field of the stator in such a way that the rotor 2 rotates about the axis of rotation R.

The rotor 2 is configured as a hollow shaft, while an interior space of the hollow shaft running through the axis of rotation R establishes a receiving area.

For the cooling of the electric machine 1 during normal operation, a cooling lance 3 is inserted from the side into the receiving area, the cooling lance 3 being arranged so as to be stationary and the rotor 2 rotating relative to the cooling lance 3 during normal operation.

The cooling lance 3 contains a duct 4 by which a cooling medium is introduced into the interior space or receiving area. The cooling medium introduced again emerges from the rotor 2 at a port, not shown, during normal operation. The flow direction of the cooling medium could also be reversed. The cooling medium may be a liquid, for example.

For the control of the electric machine 1, it is preferable to know the position of rotation of the rotor 2 and to take this into account in the control process.

For this, the electric machine 1 according to the invention contains a rotor position sensor 5, which is arranged on the cooling lance 3. A latching device, not shown, serves for the fastening of the rotor position sensor 5, in which the rotor position sensor 5 is latched or in which the rotor position sensor 5 is clipped.

However, other fastening methods may be used for the fastening of the rotor position sensor 5.

Alternatively, the rotor position sensor 5 could also be integrated in the cooling lance 3.

The rotor position sensor 5 serves for detecting the position of rotation of the rotor 2 during normal operation of the electric machine 1. In particular, the rotor position sensor 5 is designed such that it detects the position of rotation or the angular position preferably in an absolute manner. For this, a sensor track 6 for example is arranged opposite the rotor position sensor 5 on the inner wall of the hollow shaft or the rotor 2.

The rotor position sensor 5 is designed to detect the sensor track 6 and to generate an output signal based on this, which indicates the position of rotation of the rotor 2 preferably in an absolute manner.

The sensor track 6 is preferably arranged in a recess which is formed on the inside of the hollow shaft or the rotor 2.

To increase the resolution or to improve the sensor detection, it is also preferably possible to provide multiple sensor tracks 6, which are detected either by the single rotor position sensor 5 or by a plurality of rotor position sensors 5.

The output signal generated by the rotor position sensor 5 or the output signals generated by the plurality of rotor position sensors 5 are output to the outside via corresponding signal lines, which are likewise fastened to the cooling lance 3, where it/they are processed by a corresponding control apparatus and used in the control process.

As is evident from the preceding description, it is possible to integrate the rotor position sensor 5 provided for the detection of the position of rotation of the rotor 2 in the rotor 2 itself, which saves considerable design space at the end face of the electric machine 1 according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric machine for a vehicle, wherein the electric machine comprises:
    a stator; and
    a rotor, which is inserted into an interior space of the stator such that the rotor rotates about an axis of rotation during normal operation of the electric machine,
    wherein the rotor has a receiving area in which a rotor position sensor is received,
    wherein the rotor position sensor is configured to supply an output signal to control the electric machine during normal operation of the electric machine, said output signal indicating a rotational position of the rotor,
    wherein the rotor is a hollow shaft which rotates about the axis of rotation,
    wherein the receiving area is formed by the interior space of the hollow shaft,
    wherein the rotor position sensor is secured in the interior space on a carrier element and supported by the carrier element,
    wherein the carrier element is a cooling lance having at least one duct through which a cooling medium can be taken into and taken out of the hollow shaft during normal operation.

2. The electric machine according to claim 1,
    wherein the rotor position sensor is secured on the carrier element by form fit and/or force locking, and
    wherein the rotor position sensor is configured to be loosened from the carrier element in a nondestructive manner.

3. The electric machine according to claim 1, wherein the rotor position sensor is integrated in the carrier element.

4. The electric machine according to claim 1, further comprising:
    a sensor track on an inner wall of the hollow shaft forming the rotor which establishes the interior space,
    wherein the sensor track moves upon rotation of the rotor relative to the rotor position sensor,
    wherein the rotor position sensor provides the output signal by detecting the sensor track.

5. The electric machine according to claim 2, further comprising:
    a sensor track on an inner wall of the hollow shaft forming the rotor which establishes the interior space,
    wherein the sensor track moves upon rotation of the rotor relative to the rotor position sensor,
    wherein the rotor position sensor provides the output signal by detecting the sensor track.

6. The electric machine according to claim 3, further comprising:
    a sensor track on an inner wall of the hollow shaft forming the rotor which establishes the interior space,
    wherein the sensor track moves upon rotation of the rotor relative to the rotor position sensor,
    wherein the rotor position sensor provides the output signal by detecting the sensor track.

7. The electric machine according to claim 1, wherein the carrier element is introduced into the interior space of the rotor from one side of the electric machine such that the hollow shaft forming the rotor rotates relative to the carrier element during normal operation.

8. An electric machine for a vehicle, wherein the electric machine comprises:
    a stator; and
    a rotor, which is inserted into an interior space of the stator such that the rotor rotates about an axis of rotation during normal operation of the electric machine,
    wherein the rotor has a receiving area in which a rotor position sensor is received,
    wherein the rotor position sensor is configured to supply an output signal to control the electric machine during normal operation of the electric machine, said output signal indicating a rotational position of the rotor,
    wherein the rotor is a hollow shaft which rotates about the axis of rotation,
    wherein the receiving area is formed by the interior space of the hollow shaft,
    wherein the rotor position sensor is secured in the interior space on a carrier element and supported by the carrier element,
    wherein the rotor is an externally excited rotor, and wherein electrical conductors needed for a connection of the rotor position sensor extend on and/or in the carrier element and are led out from the hollow shaft, starting from the rotor position sensor, where said electrical conductors are brought together with additional electrical conductors needed for the external excitation of the rotor in a cable harness.

9. The electric machine according to claim 1, wherein a plurality of rotor position sensors are arranged on the carrier element, in a direction of the axis of rotation, to increase a resolution of the position of rotation of the rotor.

10. A vehicle having an electric drive unit for the driving the vehicle, wherein the drive unit is an electric machine comprising:
    a stator; and
    a rotor, which is inserted into an interior space of the stator such that the rotor rotates about an axis of rotation during normal operation of the electric machine,
    wherein the rotor has a receiving area in which a rotor position sensor is received,
    wherein the rotor position sensor is configured to supply an output signal to control the electric machine during normal operation of the electric machine, said output signal indicating a rotational position of the rotor,
    wherein the rotor is a hollow shaft which rotates about the axis of rotation,
    wherein the receiving area is formed by the interior space of the hollow shaft,
    wherein the rotor position sensor is secured in the interior space on a carrier element and supported by the carrier element,
    wherein the carrier element is a cooling lance having at least one duct through which a cooling medium can be taken into and taken out of the hollow shaft during normal operation.

11. The vehicle according to claim 10, wherein the rotor is an externally excited rotor, and wherein electrical conductors needed for a connection of the rotor position sensor extend on and/or in the carrier element and are led out from the hollow shaft, starting from the rotor position sensor, where said electrical conductors are brought together with additional electrical conductors needed for the external excitation of the rotor in a cable harness.

* * * * *